United States Patent
LeBlanc

(10) Patent No.: US 9,897,497 B2
(45) Date of Patent: Feb. 20, 2018

(54) TEMPERATURE-COMPENSATED STRAIN-BASED TRANSDUCER OPERATING ON DIFFERENTIAL MEASUREMENTS

(71) Applicant: Halliburton Energy Services, Inc., Houston, TX (US)

(72) Inventor: Michel Joseph LeBlanc, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/116,037

(22) PCT Filed: Mar. 20, 2014

(86) PCT No.: PCT/US2014/031346
§ 371 (c)(1),
(2) Date: Aug. 2, 2016

(87) PCT Pub. No.: WO2015/142343
PCT Pub. Date: Sep. 24, 2015

(65) Prior Publication Data
US 2017/0146417 A1    May 25, 2017

(51) Int. Cl.
*G01L 11/02* (2006.01)
*G01L 9/04* (2006.01)
*G02B 6/10* (2006.01)
*G02B 6/00* (2006.01)
*G01L 1/24* (2006.01)

(52) U.S. Cl.
CPC ............. *G01L 1/246* (2013.01); *G01L 11/025* (2013.01)

(58) Field of Classification Search
CPC .. A61B 5/02154; A61B 5/6851; A61B 5/0084; G01L 11/025; G01L 1/246; G01L 9/0076; G01L 9/0089; G02B 6/0218; G02B 6/02204; G02B 6/022; G01D 5/35316; E21B 47/06
USPC ......... 73/705, 702, 862.381, 723, 24.05, 32; 385/24, 11–14, 31, 92, 136–137
See application file for complete search history.

(56) References Cited

U.S. PATENT DOCUMENTS

| 5,892,860 A | 4/1999 | Maron et al. |
| 6,243,527 B1 * | 6/2001 | Dawson-Elli ........ G02B 6/0218 385/136 |
| 6,563,970 B1 | 5/2003 | Bohnert et al. |
| 2005/0129365 A1 | 6/2005 | Johnson |
| 2008/0285908 A1 | 11/2008 | Ling et al. |
| 2009/0297089 A1 | 12/2009 | Huang et al. |
| 2013/0317372 A1 | 11/2013 | Eberle et al. |

FOREIGN PATENT DOCUMENTS

WO    WO2011098838 A1    8/2011

* cited by examiner

*Primary Examiner* — Harshad R Patel
*Assistant Examiner* — Brandi Hopkins
(74) *Attorney, Agent, or Firm* — Gilliam IP PLLC

(57) ABSTRACT

An apparatus and method for a temperature compensated pressure gauge for downhole use based on Fiber Bragg Gratings (FBGs). The apparatus and method results in FBG measurements that can be interrogated with higher resolution and higher accuracy than from previous methods with the additional benefit of being less sensitive to error-inducing drift factors such as FBG thermal degradation and hydrogen.

13 Claims, 5 Drawing Sheets

TEMPERATURE-COMPENSATED STRAIN-BASED TRANSDUCER OPERATING ON DIFFERENTIAL MEASUREMENTS

BACKGROUND

The present disclosure relates to a fiber Bragg grating (FBG) pressure sensor assembly and a method of using it.

Fiber-optic sensors are increasingly being used as devices for sensing some quantity, typically temperature or mechanical strain, but sometimes also displacements, vibrations, pressure, acceleration, rotations, or concentrations of chemical species. The general principle of such devices is that light from a laser is sent through an optical fiber and there experiences subtle changes of its parameters either in the fiber or in one or several fiber Bragg gratings and then reaches a detector arrangement which measures these changes.

The growing interest in fiber optic sensors is due to a number of inherent advantages:

Inherently safer operation (no electrical sparks)
Immunity from EMI (electromagnetic interference)
Chemical passivity (not subject to corrosion)
Wide operating temperature range (wider than most electronic devices)
Electrically insulating (can be used in high voltage environment)

One of the most commonly used and broadly deployed optical sensors is the fiber Bragg grating (FBG), which reflects a wavelength of light that shifts in response to variations in temperature and/or strain. FBGs are constructed by using holographic interference or a phase mask to expose a short length of photosensitive fiber to a periodic distribution of light intensity. The refractive index of the fiber is permanently altered according to the intensity of light it is exposed to. The resulting periodic variation in the refractive index is called a fiber Bragg grating.

When a broad-spectrum light beam is sent to an FBG, reflections from each segment of alternating refractive index interfere constructively only for a specific wavelength of light, called the Bragg wavelength, described in equation (1). This effectively causes the FBG to reflect a specific frequency of light while transmitting all others.

$$\lambda_b = 2n\Lambda \quad (1)$$

In equation (1), $\lambda_b$ is the Bragg wavelength, n is the effective refractive index of the fiber core, and $\Lambda$ is the spacing between the gratings, known as the grating period. The reflected wavelength $\lambda_b$ is affected by two principle mechanisms 1) changes in strain on the fiber that alters the grating period as the spacing between the gratings moves, and 2) changes in temperature that alter the refractive index.

FBG strain sensors are thus somewhat complex because both temperature and strain influence the sensor's reflected wavelength. For proper strain measurements, you must compensate for the temperature effects on the FBG. You can achieve this by installing an FBG temperature sensor in close thermal contact with the FBG strain sensor. A subtraction of the FBG temperature sensor wavelength shift from the FBG strain sensor wavelength shift can then yield a temperature compensated strain value. As will be shown however, this approach can have resolution and accuracy issues.

The purpose of this disclosure is to describe a configuration and method that permits the creation of a temperature-compensated pressure gauge for downhole use that is based on Fiber Bragg Gratings and can be interrogated with higher resolution and higher accuracy than by previous methods and with the additional benefit of being less sensitive to error-inducing drift factors such as FBG thermal degradation and hydrogen attack.

This technique can be useful for any strain-based transducers that also need temperature compensation.

To simplify the description, however, we will use pressure as the measurement of interest for the strain-based transducer in the rest of this document.

DETAILED DESCRIPTION

Figure 1:
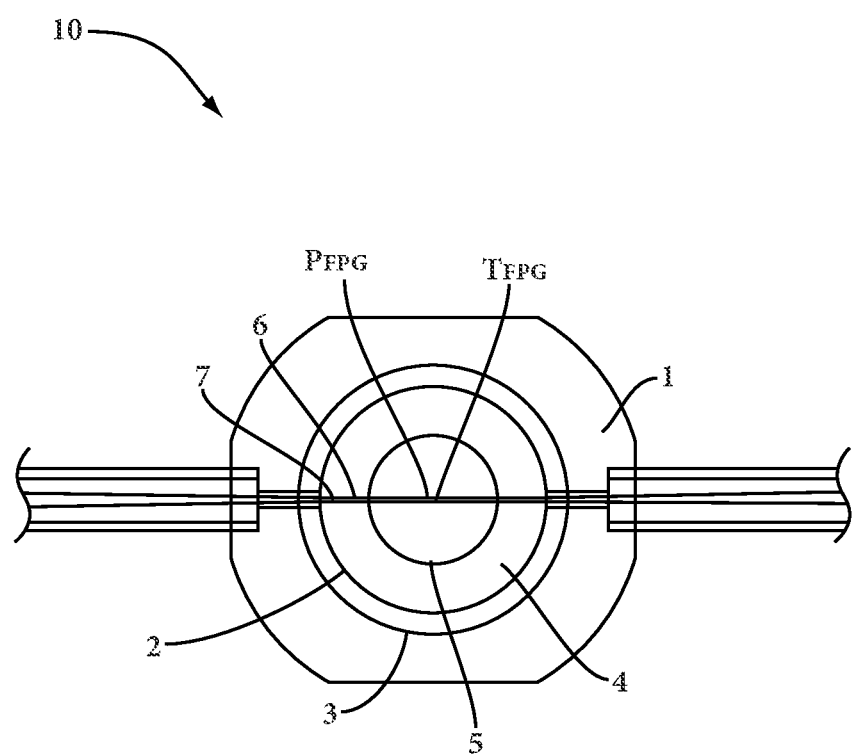
FIG. 1 illustrates a prior art fiber optic sensor assembly utilizing Fiber Bragg Gratings.
Figure 2:
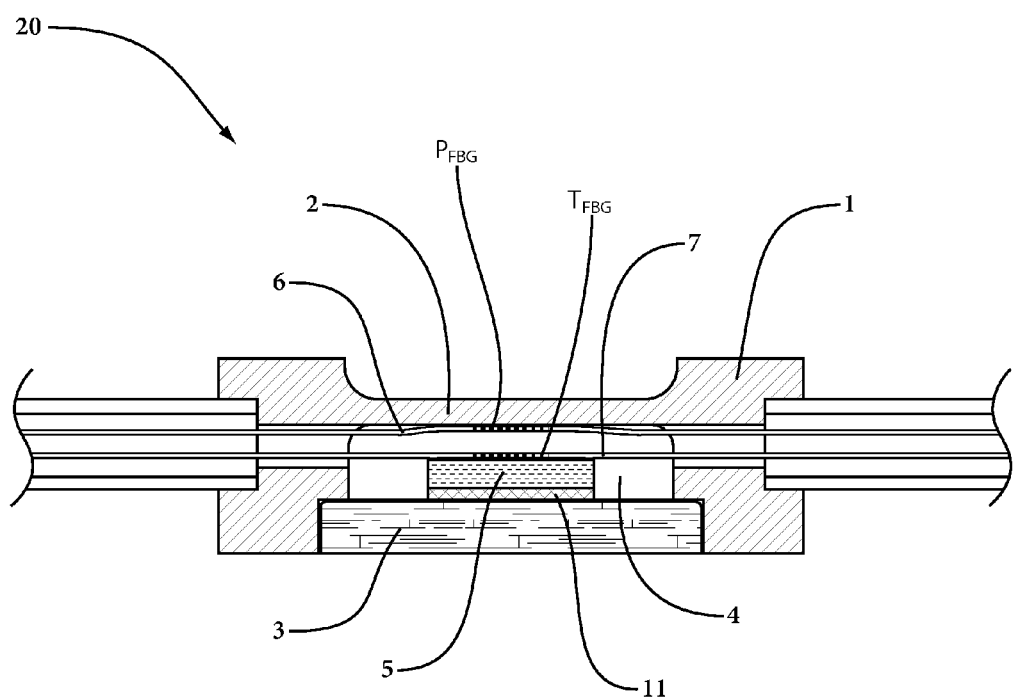
FIG. 2 is an alternate view of the prior art fiber optic sensor assembly of FIG. 1

FIGS. 1 and 2 illustrate a known prior art FBG sensor assembly involving two FBGs. FIG. 1 may be considered a top view and FIG. 2 a side view of the same assembly. The FBGs are within a housing 1, which can also be called a pressure cell. The upper wall of the housing 1 defines a diaphragm 2. The housing comprises a bottom cap 3, which is sealed and secured in a recess at the bottom of the housing 1 and in the interior 4 of the housing a coupon 5 is deployed on a flexible filler 11, such as a gel or silicone composition which creates a strain-decoupled connection mechanism.

The geometry of the sensor diaphragm 2 is defined as a thick plate membrane, with a flat surface on both sides, having an aspect ratio a/b close to 1, where a and b are the inside length and width of the diaphragm.

The diaphragm 2 is responsive to an external force such as pressure and also temperature, while the strain-decoupled coupon 5 is responsive only to temperature by way of thermal expansion, not affected by an external force or pressure.

The diaphragm 2 and the strain-decoupled coupon 5 are preferably made out of the same type materials or materials that have nominally the same mechanical properties, and in particular thermal expansion, which will enhance the temperature compensation of the pressure measurement.

This type of FBG sensor assembly may use two optical fibers 6, and 7 ending through the interior 4 of the sensor housing 1.

The optical fibers 6 and 7 are bonded to the host specimen, i.e. the diaphragm 2 and the coupon 5 or inner side wall, by means of a suitable adhesive such as epoxy resin, polyimide adhesive, silica-filled epoxy compound, an organically modified ceramic, glass solder, ceramic cement or sprayed alumina, or electro-deposited or sputtered metal (for high temperature) etc. to ensure that, over the full operating range of the optical sensor, e.g. from −20 to 800 degrees Celsius, the optical fibers 6 an 7 will stay in intimate contact with the host specimen 2 and 5 and that the strains in the host specimen 2 and 5 are transferred directly to the optical fibers attached to them with minimal long-term creep.

The first and the second optical fibers 6 and 7 each contain at least one Fiber Bragg Grating.

The Fiber Bragg Grating (FBG) has a refractive index variation that provides maximum reflectivity at a central wavelength, which will shift due to induced strain in the fiber e.g. by pulling, pushing or bending the optical fiber. The reflectivity of an FBG wavelength depends on the overall length of the grating, the periodicity of the grating, the 'normal' refractive index of the core and the modulated refractive index.

The pressure sensing FBG ($P_{FBG}$) in the first optical fiber 6 is fixed to the diaphragm 2 at a predetermined location near the center of the diaphragm 2 where the strain, caused by the deflection of the diaphragm 2, resulting from an external force or pressure at the outside of the sensor housing 1, is maximal and symmetrically distributed, and the mechanical behavior of the diaphragm 2 is predictable and repeatable. The temperature sensing FBG ($T_{FBG}$) in the second optical fiber 7 is fixed to the strain-decoupled coupon at a predetermined location unaffected by induced mechanical strain due to an external force or pressure outside of the sensor housing 1 including the diaphragm 2. This ensures that the strain on the temperature sensing FBG $T_{FBG}$ in the second optical fiber 7 is solely related to the thermal expansion of the coupon 5. The measured strain is a temperature compensation means for the pressure grating $P_{FBG}$ in the first optical fiber 6.

Figure 3:
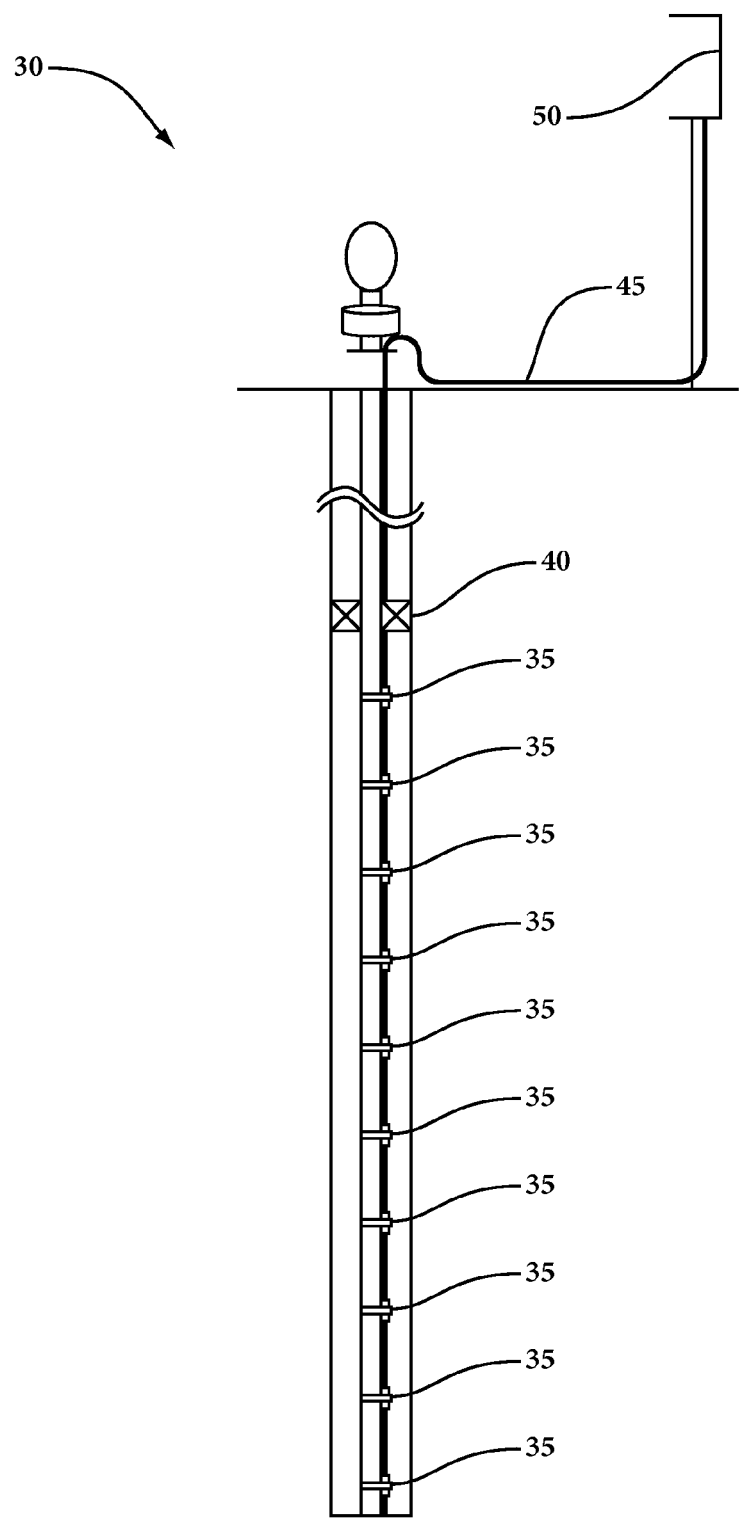
FIG. 3 illustrates a possible distributed pressure monitoring system in subsurface applications (prior art).

FIG. 3 (prior art) is one possible illustration of a distributed pressure monitoring system. This is labeled as prior art but could also be a distributed pressure monitoring system using the pressure sensor assembly of this disclosure. The distributed pressure monitoring system comprises multiple pressure sensor assemblies 35 connected via a fiber optic cable 45 to form a multipoint distributed measurement string deployed across a hydrocarbon formation to be monitored. The illustration is of a vertical string but the same principle could be used in a horizontal string. A packer 40 is shown at the top of the string but there could be multiple packers along the string if desired.

The string is connected to the topside via a downhole fiber optic cable 45. Fiber optic cable 45 is then connected to surface instrumentation 50 above ground and the surface instrumentation includes at least a Fiber Bragg Grating interrogator, and possibly a surface computer and means of remote data communication, either wired or wireless.

It is well known that Fiber Bragg Gratings are responsive to both strain and temperature. Therefore, any transducer that converts a particular physical parameter, such as pressure, into strain to be measured by an FBG must also be provided with a means to compensate for temperature. Because these two mechanisms are essentially independent an FBG can be used to make temperature measurements by isolating the fiber from strain effects and then temperature compensated strain measurements can be made with knowledge of the temperature, which is derived from a second strain-isolated FBG.

Figure 4:
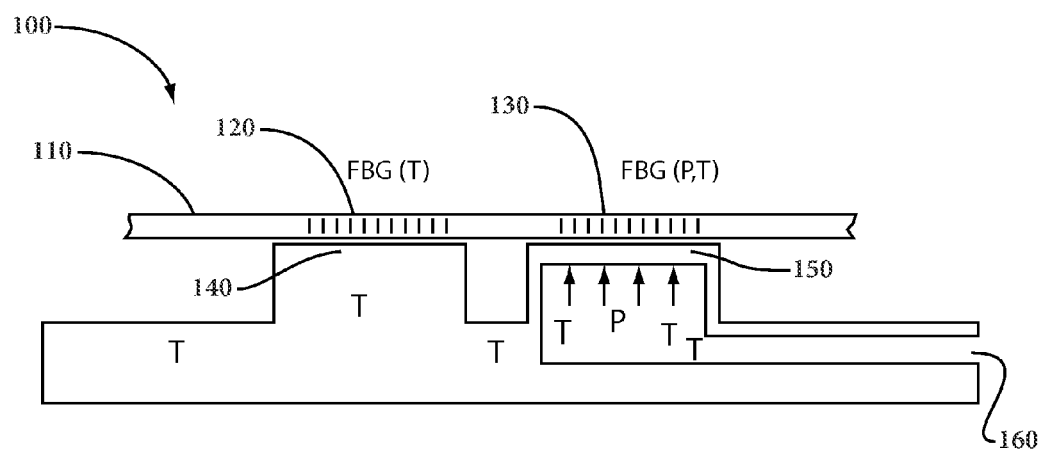
FIG. 4 illustrates another prior art fiber optic sensor assembly.

This is typically implemented in practice by encapsulating the fiber Bragg gratings into a tool that can be deployed in a drill string downhole. FIG. 4 represented by the numeral 100 illustrates another related prior art sensor assembly configuration of the internals of such a downhole pressure/temperature assembly. A fiber optic cable 110 with two separate FBG sections 120, 130 is deployed within the tool. The second fiber optic FBG section 130 is bonded to a wall 150 that is exposed to the outside pressure to be measured through an open port 160 in communication to the wellbore pressure. It is assumed that the wall 150 is flexible enough to be responsive to the pressure to be measured. The first fiber optic FBG section 120 is bonded to a wall 140 that is the same temperature but is not exposed to the pressure to be measured. The length of second fiber optic section 130 thus changes due to the pressure exerted against that section. Here both FBG 120 and FBG 130 are exposed to the same temperature but only FBG 130 is responsive to the applied pressure. Thus the wavelength shift of FBG 120 can be used to measure temperature and this temperature value can then be used to calculate pressure from the total shift of FBG 130, which is known to be due to both pressure and temperature. Furthermore, If FGB 120 is mounted on the same type of substrate as FBG 130, and if both gratings are made of similar materials and have peak wavelengths that are close together, the temperature response of both gratings are approximately the same. Therefore, as an approximation, one can use the wavelength separation between FBG 120 and FBG 130 as a value that depends only on pressure.

The traditional benefit understood for obtaining P as a wavelength separation is the near-elimination of the temperature sensitivity of the measurement. There are actually two other benefits from effecting such a differential measurement:

Any factor that affects both gratings equally will not affect the Pressure measurement.

Interrogators of Fiber Bragg Gratings often have a higher resolution and accuracy on differential measurement of wavelength compared to an absolute measurement. Thus designing a sensor such that the measurement is based on a difference of wavelengths rather than the absolute position of any wavelength peak can take advantage of the improved performance of signal conditioners when they are operated in differential mode.

A weakness of the prior art configuration of FIG. 4 is the fact the temperature measurement itself is not obtained as a differential measurement. This can be a problem because It is known that long duration exposure to elevated temperatures can cause the wavelength of a Bragg grating to shift due to re-organization of the glass structure at the interatomic bond level. Also, the presence of hydrogen within an FBG causes a shift in wavelength, which, depending on the temperature and glass composition can be a reversible, or a permanent and ongoing effect. Sensitivity to hydrogen is particularly troublesome for downhole sensors due to the prevalence of hydrogen gas in hydrocarbon reservoirs.

In the configuration of FIG. 4, the temperature measurement obtained from FBG 120 will be in error if FBG 120 is affected by either of these drift factors. Furthermore, even though the pressure reading depends mostly on the separation of the FBG 120 and FBG 130, it is usually the case that the scaling factor converting wavelength separation into pressure itself depends on temperature. If the temperature reading is in error, the selected scaling factor will also be incorrect (since the wrong T value is assumed), and therefore the effect of drift factors on the FBGs will not be totally eliminated from the pressure reading.

This disclosure proposes a new configuration that makes use of an additional FBG for the temperature reading so that temperature is also obtained from a differential measurement. In other words, there are three gratings in the configuration, two of which are used to extract temperature, and the third will be sensitive to temperature and the other parameter of interest (e.g., pressure). The result is higher accuracy and the reduced effect of drift factors for the temperature reading. This results in improved estimates of pressure.

Figure 5:
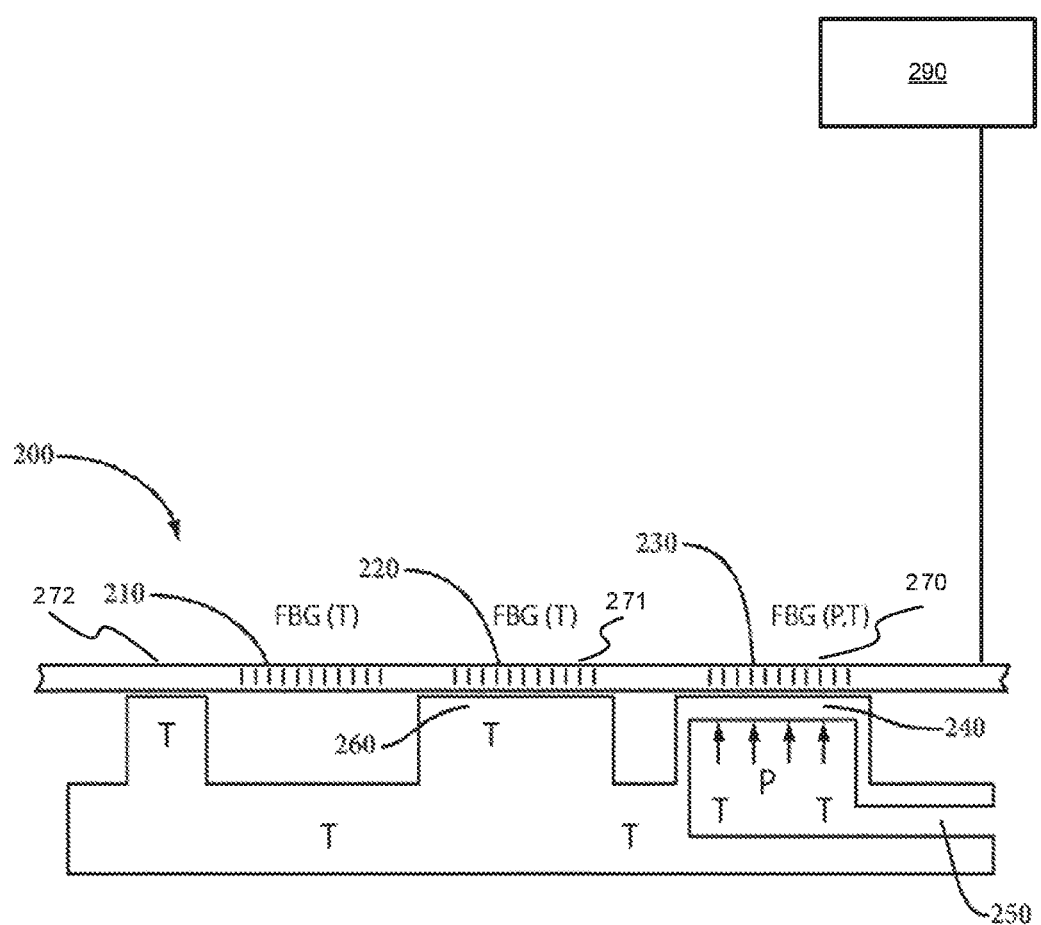
FIG. 5 illustrates a fiber optic sensor assembly representing a proposed Temperature-Compensated Strain-Based Transducer Operating on Differential Measurement.

A representative configuration for this approach is shown in FIG. 5. FIG. 5 depicts a sensor housing 200 that includes a fiberoptic cable having three FBGs (FBG 210, FBG 220, and FBG 230) employed in the tool.

At a first section 270 of the fiberoptic cable, the first FBG 230 is bonded to a first internal wall 240 that is exposed to the outside pressure to be measured through an open port 250 to the wellbore. At a second section 271 of the fiberoptic cable, the second FBG 220 is bonded to a second internal wall 260 that is the same temperature but is not exposed to the pressure to be measured. And in this example, at a third section 272 of the fiberoptic cable, the third fiber optic FBG 210 is mounted stress-free, that is not bonded to a wall. This is a first embodiment.

Note that it is not necessary that the third fiber optic FBG 210 be mounted stress-free. A good differential measurement as described in this disclosure can be obtained by bonding the third fiber optic FBG 210 onto a separate material with a different coefficient of thermal expansion (CTE) compared to that of the second grating. This represents a second embodiment and this disclosure anticipates either approach. In other words the defining element of either embodiment is that the third section of optical fiber is not bonded to the first internal wall 240 or the second internal wall 260 of the sensor housing 200. That third section can either be bonded to a third interior wall, or can be unbounded and stress-free.

The fiber optic cable containing the three FBGs is connected remotely to which a fiber Bragg grating interrogator 290 and signal conditioner can extract center wavelengths $\lambda_1$, $\lambda_2$, and $\lambda_{13}$, respectively.

For ease of understanding we will assume that the signal conditioner provides a standard error of $\delta\lambda$, on each of these absolute wavelength measurements and is considered to be independent of the particular wavelength (in other words, the uncertainty, in the "standard error sense" is of the same magnitude for all three wavelengths). That is: $S(\lambda_1)=S(\lambda_1)=S(\lambda_1)=\delta\lambda$ where $S(\bullet)$ signifies "standard error of". In contrast to this, we will make derivations where the following differential wavelength terms will appear: $(\lambda_2-\lambda_1)$ and $(\lambda_3-\lambda_2)$. Because these wavelength separations can be extracted from within a scan of the signal conditioner, the standard error on such measurement will be different, and in general smaller than $\delta\lambda$. We write: $S(\lambda_2-\lambda_1)=S(\lambda_3-\lambda_2)=\delta\lambda_{diff}$ with $\delta\lambda_{diff}<\delta\lambda$.

As a first step, let us perform the analysis assuming that no drift factor is present. For the three FBGs case, as illustrated in FIG. 5, both FBG 210 and FBG 220 depend on temperature only and we could obtain a temperature measurement from either of the two, based on either of the following equations:

$$T_1 = a_1 \lambda_1 + b_1 \quad (2)$$

$$T_2 = a_2 \lambda_2 + b_2 \quad (3)$$

Note that $T_1$ and $T_2$ now represent two separate measurements of the same temperature T. The coefficients $a_1$, $a_2$, $b_1$ and $b_2$ are determined from calibration data. Because these coefficients are themselves obtained from calibration data, they are known within a certain range of error. However, in practice, with a well designed calibration process, the error on the coefficients is responsible for a negligible proportion of the total error compared to the errors on the measurement wavelength themselves. We will therefore treat these coefficients as constants without errors for this analysis.

Thus, the errors are expressed as:

$$\delta T_1 = a_1 \cdot \delta\lambda \quad (4)$$

$$\delta T_2 = a_2 \cdot \delta\lambda \quad (5)$$

In this case, since we have two measurements, we could also calculate the average between the two. The error on this average would be:

$$\delta \bar{T} = \frac{\delta\lambda}{2}\sqrt{a_1^2 + a_2^2} \quad (6)$$

To obtain T as a differential measurement, we set $T_1=T_1=T$ in Eq. (2) and Eq. (3) and transform the equations to get:

$$\lambda_1 = \left(\frac{T-b_1}{a_1}\right) = l_1 T + m_1 \quad (7)$$

$$\lambda_2 = \left(\frac{T-b_2}{a_2}\right) = l_2 T + m_2 \quad (8)$$

where $l_1=1/a_1$, $m_1=-b_1/a_1$, $l_2=1/a_2$ and $m_2=-b_2/a_2$. Subtracting Eq. (6) from Eq. (8) and solving for T, we get:

$$T = (\lambda_2 - \lambda_1)\left(\frac{a_1 a_2}{a_1 - a_2}\right) + \left(\frac{a_1 b_2 - a_2 b_1}{a_1 - a_2}\right) \quad (9)$$

From which we derive the error:

$$\delta T_{diff} = \delta(\lambda_2 - \lambda_1)\left(\frac{a_1 a_2}{a_1 - a_2}\right) \quad (10)$$

$$\delta T_{diff} = \delta\lambda_{diff}\left(\frac{a_1 a_2}{a_1 - a_2}\right) \quad (11)$$

Likewise, for pressure, we can write:

$$\lambda_3 = k_3 P + l_3 T + m_3 \quad (12)$$

If we treat in a conventional way without using any differential mode, $$P = c_3 \lambda_3 - c_3 l_3 T - c_3 m_3 \quad (13)$$

where $c_3 = 1/k_3$. So that $$\delta P = c_3 \sqrt{\delta\lambda^2 + \frac{1}{a_3^2}\delta T^2} \quad (14)$$

However, even we can certainly operate in differential mode for this measurement. Subtracting (8) from (12) we get:

$$(\lambda_3 - \lambda_2) = k_3 P + \left(\frac{1}{a_3} - \frac{1}{a_2}\right)T + (m_3 - m_2) \quad (15)$$

where we have set $a_3=1/l_3$. From (15) we can extract P to get:

$$P = c_3(\lambda_3 - \lambda_2) + c_3\left(\frac{1}{a_2} - \frac{1}{a_3}\right)T + c_3(m_2 - m_3) \quad (16)$$

Consequently, we get for the new error on P:

$$\delta P = c_3 \sqrt{\delta\lambda_{\text{diff}}^2 + \left(\frac{a_3 - a_2}{a_2 a_3}\right)^2 \delta T^2} \qquad (17)$$

To provide a numerical example, we consider the case of FBG 220 and FBG 230 both mounted on Inconel 718 whereas FBG 210 is mounted so that it is stress-free. The response to changes of temperature for FBG 220 and FBG 230 (FBG Mounted on Inconel) is obtained from:

$$\frac{1}{\lambda^0}\frac{\partial\lambda}{\partial T} = 19.1 \times 10^{-6}/K \qquad (18)$$

so that:

$$l_2 = (\lambda_2 \cdot 19.1 \times 10^{-6}/K) = 29.414 \text{ pm}/K \qquad (19)$$

$$l_3 = (\lambda_3 \cdot 19.1 \times 10^{-6}/K) = 29.605 \text{ pm}/K \qquad (20)$$

where we have used: $\lambda_2 = 1540$ nm and $\lambda_3 = 1550$ nm.
For FBG 210 (FBG stress-free), the response is:

$$\frac{1}{\lambda^0}\frac{\partial\lambda}{\partial T} = 8.36 \times 10^{-6}/K \qquad (21)$$

so that:

$$l_1 = (\lambda_1 \cdot 8.36 \times 10^{-6}/K) = 12.791 \text{ pm}/K \qquad (22)$$

Where, in this example, $\lambda_1 = 1530$ nm.
As for FBG 230, we assume it has a pressure sensitivity given by:

$$\frac{1}{\lambda^0}\frac{\partial\lambda}{\partial P} = \left(\frac{0.8 \times 10^{-6}}{\mu\varepsilon}\right)\left(\frac{1000\mu\varepsilon}{1000\text{psi}}\right) = \frac{0.8 \times 10^{-6}}{\text{psi}} \qquad (23)$$

so that $$k_3 = \lambda_3 \cdot (0.8 \times 10^{-6}/\text{psi}) = 1.24 \text{ pm/psi} \qquad (24)$$

(Designing an FBG-based sensor so that its maximum tensile strain is $1000\mu\varepsilon$ is a desirable, conservative approach.)

Table 1 lists the values of the various parameters corresponding to this configuration. In this example, we have assumed $\delta\lambda = 1$ pm and $\delta\lambda_{\text{diff}} = 0.1$ pm.

TABLE 1

Inputs for the Estimates of Errors

| Parameter | Value | Parameter | Value |
|---|---|---|---|
| $\lambda_1$ | 1530.000 nm | $\delta\lambda$ | 1 pm |
| $\lambda_2$ | 1540.000 nm | $\delta\lambda_{\text{diff}}$ | 0.1 pm |
| $\lambda_3$ | 1550.000 nm | $c_3 = 1/k_3$ | 0.8064516 psi/pm |
| $a_1 = 1/l_1$ | 0.078181 C°/pm | $a_2 = 1/l_2$ | 0.033997 C°/pm |
| $b_1$ | −119317.2 C° | $b_2$ | −52056.02 C° |
| T Error Estimates, Conventional Approach | | | |
| $\delta T_1 = a_1 \cdot \delta\lambda$ | | 0.078 C° | |
| $\delta T_2 = a_2 \cdot \delta\lambda$ | | 0.034 C° (this is the value to use for 2 FBGs approach) | |

TABLE 1-continued

Inputs for the Estimates of Errors

| Parameter | Value | Parameter | Value |
|---|---|---|---|
| $\delta T = \frac{\delta\lambda}{2}\sqrt{a_1^2 + a_2^2}$ | | 0.043 C° (No reduction of error in this case because $\delta T_1 > \delta T_2$. Better to use simply the value of $T_2$) | |
| T Error Estimate, Differential Approach | | | |
| $\delta T_{\text{diff}} = \delta\lambda_{\text{diff}}\left(\frac{a_1 a_2}{a_1 - a_2}\right)$ | | 0.0060 C° (This is value to use for 3 FBGs approach.) | |
| P Error Estimates, two FBGs, not using differential mode at all | | | |
| $\delta P = c_3\sqrt{\delta\lambda^2 + \frac{1}{a_3^2}\delta T_2^2}$ | | 1.14 psi | |
| P Error Estimate, two FBGs, differential mode used where possible | | | |
| $\delta P = c_3\sqrt{\delta\lambda_{\text{diff}}^2 + \left(\frac{a_3 - a_2}{a_2 a_3}\right)^2 \delta T_2^2}$ | | 0.081 psi | |
| P Error Estimate, three FBGs, all from differential mode | | | |
| $\delta P = c_3\sqrt{\delta\lambda_{\text{diff}}^2 + \left(\frac{a_3 - a_2}{a_2 a_3}\right)^2 \delta T_{\text{diff}}^2}$ | | 0.081 psi | |

Tackling now the impact of wavelength drift on the measurements, let us consider in the first case what happens in the case of a single FBG being used to indicate temperature, and for numerical answers, as before, we will consider either a free FBG or one mounted on Inconel. Thus, Eq. (2) and Eq. (3) become:

$$T_1^{\text{ind}} = T_1 + \Delta T_1 = a_1(\lambda_1 + \Delta\lambda_1) + b_1 \qquad (25)$$

$$T_2^{\text{ind}} = T_2 + \Delta T_2 = a_2(\lambda_2 + \Delta\lambda_2) + b_2 \qquad (26)$$

We see that the errors on T that these measurements give are:

$$\Delta T_1 = a_1 \Delta\lambda_1 \qquad (27)$$

$$\Delta T_2 = a_2 \Delta\lambda_2 \qquad (28)$$

If instead we use the two FBGs in differential mode, Eq. (9) must be used:

$$T + \Delta T = [(\lambda_2 + \Delta\lambda_2) - (\lambda_1 + \Delta\lambda_1)]\left(\frac{a_1 a_2}{a_1 - a_2}\right) + \left(\frac{a_1 b_2 - a_2 b_1}{a_1 - a_2}\right) \qquad (29)$$

and we get:

$$\Delta T = (\Delta\lambda_2 - \Delta\lambda_1)\left(\frac{a_1 a_2}{a_1 - a_2}\right) \qquad (30)$$

And for pressure, starting with Eq. (15), we see that $$\Delta P = c_3 \Delta\lambda_3 - c_3 l_3 \Delta T \qquad (31)$$

whereas, in the full differential mode case, we have:

$$\Delta P = c_3(\Delta\lambda_3 - \Delta\lambda_2) + c_3\left(\frac{1}{a_2} - \frac{1}{a_3}\right)\Delta T \qquad (32)$$

Notice how, in differential mode, it is the difference in the shifts of two wavelengths that becomes the cause of error. If the cause of drift affects both gratings equally, the shift in canceled. Similarly to Equations (18), (21) and (23) above, it is likely that a cause of drift would cause a shift proportional to the initial wavelength of the grating. There may be other reasons for grating-to-grating variation but since the gratings we start with are at different wavelengths, even in the case of a proportional shift, the drift-induced shift will be different for the different gratings. Therefore, the ratio of "spread in $\Delta\lambda$" to $\Delta\lambda$ will typically be at least be of the order of the initial relative separation, or, expressed mathematically:

$$\frac{|\Delta\lambda_2 - \Delta\lambda_1|}{\frac{1}{2}(|\Delta\lambda_1| + |\Delta\lambda_2|)} \approx \frac{|\lambda_2 - \lambda_1|}{\frac{1}{2}(\lambda_1 + \lambda_2)} + \text{non-proportional shift spread} \quad (33)$$

The potential causes for non-proportional shift spread are numerous. For example, the gratings can be written with different strengths, and different index of modulation of amplitude profiles. Or they may be exposed to slightly different environments due to their coating, etc. All of which could cause the drift of gratings to vary from one grating to another. Nonetheless, in general, we should usually get that the spread in wavelength shift due to drift to be smaller than the total shift of any single grating. Therefore, operating in differential mode will usually decrease the impact of drift-causing factors.

To further increase the likelihood that drift will be common among the gratings, the three principles below should be used:

The gratings should be manufactured along the same fiber, with the same exposure, same length, and same modulation depth profile $\Delta n(z)$ along the length of the grating so that the physical characteristics as close to each other as possible.

The initial wavelength separation of the gratings should be as small as possible, consistent with low cross-talk by the signal conditioner and the need to avoid any overlap of wavelengths that would prevent the signal conditioner from detecting each wavelength peak individually.

Numerical examples of the effect of drift are provided in Tables 2 and 3. Two cases are considered. In the first (Table 2), we assume a drift of 0.01% for all gratings. This is the simplest form of drift (all gratings affected equally, with shift proportional to their initial wavelengths). In the second case (Table 3), we subtract 0.001% to the drift of $\lambda_1$ and add 0.001% to the drift of $\lambda_3$. This is to increase their spread. The impact on the temperature measurement and the pressure measurement are provided for all cases. These are absolute shift errors. Since in practice we typically do not know if drift is taking place compared to a real measurement effect, what we want is to keep these errors as small as possible. For instance acceptable drifts are of the order of 0.5° C./yr and 1 psi/yr, for temperature and pressure, respectively would be desired.

TABLE 2

Case 1: Proportional drift

| Parameter | Value | Parameter | Value |
|---|---|---|---|
| $\lambda_1$ | 1530.000 nm | $\Delta\lambda_1$ | 0.1530 nm |
| $\lambda_2$ | 1540.000 nm | $\Delta\lambda_2$ | 0.1540 nm |
| $\lambda_3$ | 1550.000 nm | $\Delta\lambda_3$ | 0.1550 nm |
| T Error Due to Drift, Conventional Approach | | | |
| $\Delta T_1 = a_1 \cdot \Delta\lambda_1$ | | 11.96 C° | |
| $\Delta T_2 = a_2 \cdot \Delta\lambda_2$ | | 5.24 C° | |

TABLE 2-continued

Case 1: Proportional drift

| Parameter | Value | Parameter | Value |
|---|---|---|---|
| T Error Due to Drift, Differential Approach | | | |
| $\Delta T_{diff} = (\Delta\lambda_2 - \Delta\lambda_1)\left(\frac{a_1 a_2}{a_1 - a_2}\right)$ | | 0.060 C° | |
| P Error Due to Drift, Traditional Forms | | | |
| $\Delta P = c_3 \Delta\lambda_3 - c_3 l_3 \Delta T_1$ | | −160.59 psi | |
| $\Delta P = c_3 \Delta\lambda_3 - c_3 l_3 \Delta T_2$ | | 0.00 psi (SEE TEXT NOT BELOW) | |
| $\Delta P = c_3 \Delta\lambda_3 - c_3 l_3 \Delta T_{diff}$ | | 123.6 psi | |
| P Error Due to Drift, Differential Mode | | | |
| $\Delta P = c_3(\Delta\lambda_3 - \Delta\lambda_2) - c_3 l_3 \Delta T_{diff}$ | | 0.80 psi | |

TABLE 3

Case 2: Proportional drift with additional non-proportional spreas

| Parameter | Value |
|---|---|
| $\Delta\lambda_1 = 0.009\% \lambda_1$ | 0.1377 nm (compared to 0.1530 nm in Case 1) |
| $\Delta\lambda_2 = 0.010\% \lambda_2$ | 0.1540 nm |
| $\Delta\lambda_3 = 0.011\% \lambda_3$ | 0.1705 nm (compared to 0.1550 nm in Case 1) |
| T Error Due to Drift, Conventional Approach | |
| $\Delta T_1 = a_1 \cdot \Delta\lambda_1$ | 10.77 C° |
| $\Delta T_2 = a_2 \cdot \Delta\lambda_2$ | 5.24 C° |
| T Error Due to Drift, Differential Approach | |
| $\Delta T_{diff} = (\Delta\lambda_2 - \Delta\lambda_1)\left(\frac{a_1 a_2}{a_1 - a_2}\right)$ | 0.98 C° |
| P Error Dur to Drift, Traditional Forms | |
| $\Delta P = c_3 \Delta\lambda_3 - c_3 l_3 \Delta T_1$ | −119.53 psi |
| $\Delta P = c_3 \Delta\lambda_3 - c_3 l_3 \Delta T_2$ | 12.50 psi (SEE PREVIOUS PAGE) |
| $\Delta P = c_3 \Delta\lambda_3 - c_3 l_3 \Delta T_{diff}$ | 114.09 psi |
| P Error Due to Drift, Differential Mode | |
| $\Delta P = c_3(\Delta\lambda_3 - \Delta\lambda_2) - c_3 l_3 \Delta T_{diff}$ | 13.16 psi |

Note that, in the results of Tables 2 and 3, the differential method does not provide the lowest error. Rather, the lowest P error is obtained by using absolute wavelength processing of two FBGs (220 and 230). This two wavelength approach works well in this case because 220 and 230 are mounted on the same substrate and the math works out to eliminate the drift as long as it is proportional to the initial wavelengths of the two grating. The temperature measurement would be in error, however, so for temperature a third grating would still be desirable. However, in addition to this, one should note that absolute wavelength processing causes the error on the pressure to be 1.14 psi, per Table 1. So, even though for this approach the effect of drift could be lower, it would be hidden by the larger total error. Furthermore, the effect of the temperature error would be felt on the coefficient $c_3(T)$ so we would still want to have an accurate temperature reading. Consequently, with these considerations, we should see that the use of three gratings is superior even for the P reading.

Commercial Utility

To summarize, new elements brought by this disclosure are a) the use of two FBG's for measuring temperature in differential mode; b) the use of strictly differential wavelength measurements for both temperature and the second parameter of interest (e.g. pressure); this allows us to make better use of how interrogators work; and c) making sure that the FBG's are closely matched in terms of how they are manufactured to reduce differences in drift from grating to grating.

The disclosure herein uses two FBGs for temperature measurement. All measurements (T and P) are based on differential measurements. This makes explicit use of differential measurement capability of interrogators, exploiting the higher resolution and accuracy that such interrogators have when used for differential as opposed to absolute wavelength measurements. The disclosure also specifies aspects of FBG manufacturing to ensure gratings within the same gauge will have similar drift behavior, to reduce the drift-induced error on the measurement.

This capability will allow FBG-based pressure gauges to work with accuracy and resolution that will come close to, or even equal, quartz-based gauges. The gauges built with this technique will also be more tolerant of drift-causing factors such as elevated temperature and hydrogen.

The invention claimed is:

1. A pressure sensor assembly, comprising:
   a) a sensor housing having a first internal wall responsive to deform in response to a pressure difference between an interior and an exterior of the sensor housing;
   b) a fiber optic cable deployed through the sensor housing having a first section bonded to the first internal wall of the sensor housing such that the length of the first section changes both in response to deformation of the first internal wall from the pressure difference between the interior and exterior of the sensor housing and to changes in response to thermal deformation of the first internal wall;
   c) a second section of the fiber optic cable bonded to a second internal wall of the sensor housing that is not exposed to the pressure difference between the interior and exterior of the sensor housing such that the length of the second section changes only in response to thermal deformation of the second internal wall;
   d) a third section of the fiber optic cable not bonded to either of the first or second internal walls of the sensor housing; and
   e) wherein each of the first, second, and third sections of the fiber optic cable comprises at least one fiber Bragg grating.

2. The pressure sensor assembly of claim 1 wherein the first internal wall and the second internal wall are made of a material with the same or similar thermal expansion coefficient.

3. The pressure sensor assembly of claim 1 wherein the first internal wall and the second internal wall are made of the same material.

4. The pressure sensor assembly of claim 1 wherein the first internal wall responsive to deform to the pressure difference between the interior and exterior of the sensor housing is exposed to the outside pressure to be measured through an open port.

5. The pressure sensor assembly of claim 1 wherein the at least one fiber Bragg grating of first, second, and third sections of the fiber optic cable within the sensor housing are manufactured with a same laser exposure, at a same length, and have a same modulation depth profiles along a length of the at least one fiber Bragg grating.

6. The pressure sensor assembly of claim 1 wherein the third section of the fiber optic cable is bonded to a third internal wall of the sensor housing.

7. The pressure sensor assembly of claim 6 wherein the first internal wall and the second internal wall are made of a material with the same or similar coefficient of thermal expansion and the third internal wall is made of a material with a different coefficient of thermal expansion than the second internal wall.

8. The pressure sensor assembly of claim 1, wherein a first pressure measurement and a first temperature measurement are made at the at least one fiber Bragg grating in the first section, wherein a second pressure measurement is made at the at least one fiber Bragg grating in the second section, and wherein a second temperature measurement at the at least one fiber Bragg grating in the third section.

9. The pressure sensor assembly of claim 8, wherein a differential pressure measurement is determined based on a difference between the first pressure measurement and the second pressure measurement, wherein a differential temperature measurement is determined based on a difference between the first temperature measurement and the second temperature measurement, and wherein the differential pressure measurement is corrected based on the differential temperature measurement.

10. A method comprising:
   lowering a pressure sensor assembly into a wellbore, wherein the pressure sensor assembly comprises,
      a sensor housing having a first internal wall responsive to deform in response to a pressure difference between an interior and an exterior of the sensor housing;
      a fiber optic cable deployed through the sensor housing, wherein the fiber optic cable comprises,
         a first section having a first fiber Bragg grating and bonded to the first internal wall of the sensor housing such that the length of the first section changes both in response to deformation of the first internal wall from the pressure difference between the interior and exterior of the sensor housing and such that the length changes in response to thermal deformation of the first internal wall;
         a second section having a second fiber Bragg grating and bonded to a second internal wall of the sensor housing that is not exposed to the pressure difference between the interior and exterior of the sensor housing such that the length of the second section changes in response to thermal deformation of the second internal wall; and
         a third section having a third Bragg grating and not bonded to either of the first or second internal walls of the sensor housing;
   performing a differential pressure measurement in the wellbore around the pressure sensor assembly based difference in pressure measurements between the first fiber Bragg grating and the second fiber Bragg grating; and
   performing a differential temperature measurement in the wellbore around the pressure sensor assembly based a difference in temperature between the second fiber Bragg grating and the third fiber Bragg grating.

11. A method comprising:
   lowering pressure sensor assembly into a wellbore wherein the pressure sensor assembly comprises,
      a sensor housing having a first internal wall responsive to deform in response to a pressure difference between an interior and an exterior of the sensor housing;
      a fiber optic cable deployed through the sensor housing, wherein the fiber optic cable comprises,
         a first section having a first fiber Bragg grating and bonded to the first internal wall of the sensor housing such that the length of the first section changes both in response to deformation of the first internal wall from the pressure difference between the interior and exterior of the sensor housing and such that the length changes in response to thermal deformation of the first internal wall;

a second section having a second fiber Bragg grating and bonded to a second internal wall of the sensor housing that is not exposed to the pressure difference between the interior and exterior of the sensor housing such that the length of the second section changes in response to thermal deformation of the second internal wall; and a third section having a third fiber Bragg grating and not bonded to either of the first or second internal walls of the sensor housing;

performing a pressure measurement of a pressure obtained by the first fiber Bragg gratings;

performing a first temperature measurement at the second Fiber Bragg grating;

performing a second temperature measurement at the third Fiber Bragg grating;

determining a differential temperature measurement between the first temperature measurement and the second temperature measurement; and correcting the pressure measurement based on the differential temperature measurement.

12. A distributed pressure monitoring system deployed across a hydrocarbon formation to be monitored comprising:

a fiber optic cable to be positioned in a wellbore;

multiple pressure sensor assemblies wherein each pressure sensor assembly comprises, a sensor housing having a first internal wall responsive to deform in response to a pressure difference between an interior and an exterior of the sensor housing, wherein the fiber optic cable is deployed through the sensor housing, and wherein within each sensor housing the fiber optic cable comprises, a first section having a first fiber Bragg grating and bonded to the first internal wall of the sensor housing such that the length of the first section changes both in response to deformation of the first internal wall from the pressure difference between the interior and exterior of the sensor housing and such that the length changes in response to thermal deformation of the first internal wall;

a second section having a second fiber Bragg grating and bonded to a second internal wall of the sensor housing that is not exposed to the pressure difference between the interior and exterior of the sensor housing such that the length of the second section changes in response to thermal deformation of the second internal wall; and a third section having a third fiber Bragg grating and not bonded to either of the first or second internal walls of the sensor housing; and an instrumentation at a surface of the Earth and coupled to the multiple pressure sensor assemblies through the fiber optic cable, wherein the instrumentation comprises a fiber Bragg grating interrogator.

13. The distributed pressure monitoring system of claim 12, wherein the fiber Bragg grating interrogator is to:

perform a first pressure measurement and a first temperature measurement at the first fiber Bragg grating;

perform a second pressure measurement at the second fiber Bragg grating; and perform a second temperature measurement at the third fiber Bragg grating;

wherein the distributed pressure monitoring system further comprises, a computer connected to the fiber Bragg grating interrogator, wherein the computer is to, determine a differential pressure measurement based on a difference between the first pressure measurement and the second pressure measurement;

determine a differential temperature measurement based on a difference between the first temperature measurement and the second temperature measurement; and correct the differential pressure measurement based on the differential temperature measurement.

* * * * *